(12) United States Patent
Ward et al.

(10) Patent No.: US 10,100,235 B2
(45) Date of Patent: Oct. 16, 2018

(54) TWO-PART CYANOACRYLATE CURABLE ADHESIVE SYSTEM

(71) Applicant: Henkel IP & Holding GmbH, Duesseldorf (DE)

(72) Inventors: Emer Ward, Dublin (IE); Deborah Coleman, County Louth (IE); Raymond Tully, Slane County Meath (IE)

(73) Assignee: Henkel IP & Holding GmbH, Duesseldorf (DE)

( * ) Notice: Subject to any disclaimer, the term of this patent is extended or adjusted under 35 U.S.C. 154(b) by 0 days.

(21) Appl. No.: 15/602,473

(22) Filed: May 23, 2017

(65) Prior Publication Data
US 2017/0335151 A1 Nov. 23, 2017

(51) Int. Cl.
| C09J 133/14 | (2006.01) |
| C09J 5/00 | (2006.01) |
| C09J 11/06 | (2006.01) |
| C08F 222/10 | (2006.01) |
| C08F 222/32 | (2006.01) |
| C08K 5/09 | (2006.01) |
| C08K 5/315 | (2006.01) |
| C09J 4/00 | (2006.01) |
| C09J 4/06 | (2006.01) |
| C08K 5/47 | (2006.01) |
| C09J 135/04 | (2006.01) |
| C08L 33/10 | (2006.01) |
| C08L 35/04 | (2006.01) |

(52) U.S. Cl.
CPC ........ C09J 133/14 (2013.01); C08F 222/1006 (2013.01); C08F 222/32 (2013.01); C08K 5/09 (2013.01); C08K 5/315 (2013.01); C08K 5/47 (2013.01); C08L 33/10 (2013.01); C08L 35/04 (2013.01); C09J 4/00 (2013.01); C09J 4/06 (2013.01); C09J 5/00 (2013.01); C09J 11/06 (2013.01); C09J 135/04 (2013.01); C09J 2433/00 (2013.01)

(58) Field of Classification Search
CPC .................................................. C09J 133/14
See application file for complete search history.

(56) References Cited

U.S. PATENT DOCUMENTS

| 3,832,334 | A | 8/1974 | O'Sullivan et al. |
| 4,196,271 | A | 4/1980 | Yamada et al. |
| 4,440,910 | A | 4/1984 | O'Connor |
| 4,450,265 | A | 5/1984 | Harris |
| 4,532,293 | A | 7/1985 | Ikeda et al. |
| 4,556,700 | A | 12/1985 | Harris et al. |
| 4,622,414 | A | 11/1986 | McKervey |
| 4,636,539 | A | 1/1987 | Harris et al. |
| 4,695,615 | A | 9/1987 | Leonard et al. |
| 4,718,966 | A | 1/1988 | Harris et al. |
| 4,837,260 | A | 6/1989 | Sato et al. |
| 4,855,461 | A | 8/1989 | Harris |
| 4,906,317 | A | 3/1990 | Liu |
| 5,288,794 | A | 2/1994 | Attarwala |
| 5,312,864 | A | 5/1994 | Wenz et al. |
| 5,328,944 | A | 7/1994 | Attarwala et al. |
| 5,424,343 | A | 6/1995 | Attarwala |
| 5,530,037 | A | 6/1996 | McDonnell et al. |
| 5,536,799 | A | 7/1996 | Takahashi et al. |
| 6,607,632 | B1 | 8/2003 | McDonnell et al. |
| 2008/0314519 | A1 | 12/2008 | Attarwala et al. |
| 2014/0124137 | A1* | 5/2014 | Hedderman ............... C09J 4/00 156/331.8 |
| 2014/0275419 | A1* | 9/2014 | Ward ..................... C09J 135/04 524/879 |

FOREIGN PATENT DOCUMENTS

| GB | 2544101 A | * 5/2017 | ............... C09J 4/06 |
| JP | 6145606 A | 5/1994 | |

OTHER PUBLICATIONS

Millet, G.H. "Cyanoacrylate Adhesives" in Structural Adhesives: Chemistry and Technology, S.R. Hartshorn ed. Plenum Press, New York, 1986, pp. 249-307.

Coover, H.W., Driefus, D.W., and O'Connor, J.T. "Cyanoacrylate Adhesives." in Handbook of Adhesives 3rd ed., 27, I. Skeist, ed., Van Nostrand Reinhold, NY (1990), pp. 463-477.

* cited by examiner

Primary Examiner — Daniel H Lee
(74) Attorney, Agent, or Firm — Steven C. Bauman

(57) ABSTRACT

Two-part cyanoacrylate compositions, methods for making same, and uses therefor are described. The compositions can be used to bond a variety of substrates including plastics and metals. The compositions remain effective after thermal ageing and humid ageing.

32 Claims, 3 Drawing Sheets

TWO-PART CYANOACRYLATE CURABLE ADHESIVE SYSTEM

BACKGROUND

Field

This invention relates to cyanoacrylate-containing compositions, which when cured provide improved humidity and thermal resistance.

Brief Description of Related Technology

Cyanoacrylate adhesive compositions are well known, and widely used as quick setting, instant adhesives with a wide variety of uses. See H. V. Coover, D. W. Dreifus and J. T. O'Connor, "Cyanoacrylate Adhesives" in Handbook of Adhesives, 27, 463-77, I. Skeist, ed., Van Nostrand Reinhold, New York, 3rd ed. (1990). See also G. H. Millet, "Cyanoacrylate Adhesives" in Structural Adhesives: Chemistry and Technology, S. R. Hartshorn, ed., Plenum Press, New York, p. 249-307 (1986).

In the past, efforts have been made to improve the heat resistance of cured products of cyanoacrylate composition, particularly upon exposure to elevated temperature conditions, such as 120° C., 150° C. and 180° C. As the cured products are thermoplastic in nature they tend to soften as the temperature increases and when the Tg of the material is surpassed the cured product begins to flow. As the temperature increase progresses, a degradation begins and the physical properties deteriorate. As a result, commercial applications for cyanoacrylates where exposure to elevated temperature conditions is likely have proven tricky and consequently have been limited.

Thermal resistance conferring agents are known for use in cyanoacrylates.

For instance, U.S. Pat. No. 5,328,944 (Attarwala) describes improved cyanoacrylate monomer adhesive formulations where the formulation includes an effective amount, for enhancing the thermal resistance of the cured polymer, of sulfur containing compounds of a specified the formula, including anhydrosulfites, sulfoxides, sulfites, sulfonates, methanesulfonates, p-toluenesulfonates, sulfinates, and cyclic sulfinates; U.S. Pat. No. 5,288,794 (Attarwala) describes improved cyanoacrylate monomer adhesive formulations where the formulation includes an effective amount, for enhancing the thermal resistance of the cured polymer, of mono, poly or hetero aromatic compounds characterized by having at least three substitutions on an aromatic ring thereof, two or more of the substitutions being electron withdrawing groups, examples of which aromatic compounds being 2,4-dinitrofluorobenzene, 2,4-dinitrochlorobenzene, 2,4-difluoronitrobenzene, 3,5-dinitrobenzonitrile, 2-chloro-3,5-dinitrobenzonitrile, 4,4'-difluoro-3,3'-dinitrophenyl sulfone, pentafluoronitrobenzone; pentafluorobenzonitrile, α,α,α-2-tetrafluoro-p-tolunitrile and tetrachloroterphthalonitrile); and U.S. Pat. No. 5,424,343 (Attarwala) describes cyanoacrylate monomer adhesive formulations, which cure to form a polymer, comprising a cyanoacrylate monomer and an effective amount, for enhancing the thermal resistance of the cured polymer, of a naphthosultone compound substituted with at least one strong electron withdrawing group, said group being at least as strongly electron withdrawing as a nitro group. Further examples of cyanoacrylate compositions comprising thermal resistance conferring agents are found for example in U.S. Pat. No. 5,536,799 and Japanese Patent Document No. JP H06-145606.

The use of carboxylic acids and their anhydrides in cyanoacrylate compositions to improve thermal and moisture resistance is also known.

For instance, U.S. Pat. No. 3,832,334 is directed to the addition of maleic anhydride, which is reported to produce cyanoacrylate adhesives having increased thermal resistance (when cured) while preserving fast cure speed.

U.S. Pat. No. 4,196,271 is directed to tri-, tetra- and higher carboxylic acids or their anhydrides, which are reported to be useful for improving heat resistance of cured cyanoacrylate adhesives.

U.S. Pat. No. 4,450,265 is directed to the use of phthalic anhydride to improve heat resistance of cyanoacrylate adhesives. More specifically, the '265 patent is directed to and claims an adhesive composition comprising a polymerizable constituent the major part of which comprises at least one ester of 2-cyanoacrylic acid, characterized in that the composition additionally comprises a proportion of phthalic anhydride effective for favourably influencing the strength and/or durability of adhesive bonds formed from the composition, under exposure to moisture or elevated temperature. The effective amount is reported as 0.1% to 5%, such as 0.3% to 0.7%, by weight of the composition. The '265 patent reports the superiority of phthalic anhydride over compositions where no additive was used, and where maleic anhydride was used (though less pronounced in the case of stainless steel lap shears than in those of aluminium).

U.S. Pat. No. 4,532,293 is directed to the use of benzophenonetetracarboxylic acid or its anhydride to provide a superior heat resistance for cyanoacrylate adhesives.

Rubber toughened cyanoacrylates are known.

For instance, U.S. Pat. No. 4,440,910 (O'Connor) pioneered rubber toughened cyanoacrylate compositions through the use of certain organic polymers as toughening additives that are elastomeric, i.e., rubbery, in nature. The '910 patent is thus directed to and claims a curable adhesive comprising a substantially solvent-free mixture of: (a) a cyanoacrylate ester, and (b) about 0.5% to about 20% by weight of an elastomeric polymer. The elastomeric polymer is selected from elastomeric copolymers of a lower alkene monomer and (i) acrylic acid esters, (ii) methacrylic acid esters or (iii) vinyl acetate. More specifically, the '910 patent notes that as toughening additives for cyanoacrylates, acrylic rubbers; polyester urethanes; ethylene-vinyl acetates; fluorinated rubbers; isoprene-acrylonitrile polymers; chlorosulfinated polyethylenes; and homopolymers of polyvinyl acetate were found to be particularly useful.

The elastomeric polymers are described in the '910 patent as either homopolymers of alkyl esters of acrylic acid; copolymers of another polymerizable monomer, such as lower alkenes, with an alkyl or alkoxy ester of acrylic acid; and copolymers of alkyl or alkoxy esters of acrylic acid. Other unsaturated monomers which may be copolymerized with the alkyl and alkoxy esters of acrylic include dienes, reactive halogen-containing unsaturated compounds and other acrylic monomers such as acrylamides. One group of elastomeric polymers are copolymers of methyl acrylate and ethylene, manufactured by DuPont™, under the name of VAMAC®, such as VAMAC® N123 and VAMAC® B-124. VAMAC® N123 and VAMAC® B-124 are reported by DuPont™ to be a master batch of ethylene/acrylic elastomer.

Henkel Corporation (as the successor to Loctite Corporation) has sold for a number of years since the filing of the '910 patent, rubber toughened cyanoacrylate adhesive products under the trade name BLACK MAX, which employ as the rubber toughening component, the DuPont materials called VAMAC® B-124 and N123. In addition, Henkel has sold in the past clear and substantially colourless rubber toughened cyanoacrylate adhesive products, namely, LOC-TITE™ 4203, 4204 and 4205, which employ as the rubber toughening component, the DuPont material, VAMAC G.

U.S. Patent Application Publication No. 2008-0314519 (Attarwala) is directed to an improvement of this rubber toughened cyanoacrylate adhesive technology, more specifically, where the rubber toughening agent consists essentially of (a) reaction products of the combination of ethylene, methyl acrylate and monomers having carboxylic acid cure sites, (b) dipolymers of ethylene and methyl acrylate, and combinations of (a) and (b), and being substantially free of release agents, anti-oxidants, stearic acid and/or polyethylene glycol ether wax.

U.S. Pat. No. 5,536,799 (Takahashi) speaks to the use of dipentaerythritol esters in cyanoacrylates to improve heat aging. Preferred esters are noted to be dipentaerythritoltriacrylate (available from Nippon Kayaku Co., Ltd. as KAYARAD® D-330), dipentaerythritoltetraacrylate (available from Nippon Kayaku Co., Ltd. as KAYARAD® D-320), dipentaerythritolpentaacrylate (available from Nippon Kayaku Co., Ltd. as KAYARAD® D-310) and dipentaerythritolhexaacrylate (available from Nippon Kayaku Co., Ltd. as KAYARAD® DPHA). The object of this technology seems to be to bond flexible substrates, which without a more flexible cyanoacrylate adhesive to bond the substrates, would otherwise cause the cyanoacrylate adhesive to crack. The noted substrates to be bonded are chloroprene rubber, EPDM and other synthetic rubbers and Bakelite.

Recently, the Henkel Adhesive Technologies business invented two technologies to address these desires. One is directed to cyanoacrylate adhesive compositions, comprising: (a) a mono-functional cyanoacrylate component (such as allyl-2-cyanoacrylate), and (b) a multi-functional cyanoacrylate component (such as bis-cyanoacrylate). The other is directed to cyanoacrylate-containing compositions that include, in addition to the cyanoacrylate component, a hydrogenated phthalic anhydride and optionally a benzonitrile. See U.S. Patent Application Publication No. 2014/0124137.

Despite these efforts, there has been a longstanding desire to achieve more robust thermal and humidity performance from cyanoacrylate compositions. It would accordingly be quite advantageous to provide another solution to that desire.

SUMMARY

In one aspect, the present invention provides a two-part curable composition comprising:

(a) a first part comprising a cyanoacrylate composition comprising:

a cyanoacrylate component, and a rubber toughening agent comprised of (i) reaction products of the combination of ethylene, methyl acrylate and monomers having carboxylic acid cure sites, (ii) dipolymers of ethylene and methyl acrylate, and combinations of (i) and (ii); and (b) a second part comprising:

a 2-substituted benzothiazole or derivative thereof, wherein the 2-substitutent is a $C_{1-20}$ alkyl, a $C_{2-20}$ alkene, a $C_{8-20}$ alkylbenzyl, a $C_{1-20}$ alkylamino, a $C_{1-20}$ alkoxy, a $C_{1-20}$ alkylhydroxy, an ether, a sulfenamide, a $C_{1-20}$ thioalkyl or a $C_{1-20}$ thioalkoxy group; and where at least one of the first or second part, further comprises:

a component containing at least two (meth)acrylate functional groups, at least one benzonitrile compound substituted with at least two or more electron withdrawing groups selected from halo, $—NO_2$, or $—CN$ and combinations thereof, and at least one anhydride component.

The component containing at least two (meth)acrylate functional groups may be in the first part or in the second part or in both parts. The at least one benzonitrile compound substituted with at least two or more electron withdrawing groups selected from halo, $—NO_2$, or $—CN$ and combinations thereof may be in the first part or in the second part or in both parts. The at least one anhydride component may be in the first part or in the second part or in both parts.

Advantageously, the compositions of the present invention bond a wide variety of substrates, and demonstrate excellent tensile strength performance after thermal ageing and humid ageing.

Suitably, the cyanoacrylate component is selected from materials within the structure $H_2C=C(CN)—COOR$, wherein R is selected from $C_{1-15}$ alkyl, $C_{2-15}$ alkoxyalkyl, $C_{3-15}$ cycloalkyl, $C_{2-15}$ alkenyl, $C_{6-15}$ aralkyl, $C_{5-15}$ aryl, $C_{2-15}$ allyl and $C_{1-15}$ haloalkyl groups; for example, suitably, the cyanoacrylate component is ethyl-2-cyanoacrylate.

The 2-substituted benzothiazole may be further substituted with at least one halo, $C_{1-20}$ thioalkyl, $C_{1-20}$ haloalkyl, $C_{1-20}$ alkyl $C_{1-20}$ alkoxy or hydroxyl substituent, for example, the 2-substituted benzothiazole may be substituted with halo and the halo substituent may be Cl, F or Br.

Suitably, the 2-substituted benzothiazole may be selected from: 5-chloro-2-methyl benzothiazole, 5-bromo-2-methyl-1,3-benzothiazole, 2-[(tert-butylamino)thio]-1,3-benzothiazol-5-ol, 5,6-dichloro-2-methyl-1,3-benzothiazole, 6-bromo-2-methyl-1,3-benzothiazole, 5-fluoro-2-methyl-1,3-benzothiazole, 6,7-dichloro-2-methyl-1,3-benzothiazole, 2,5-dimethyl-1,3-benzothiazole, 4,5,6,7-tetrafluoro-2-methyl-1,3-benzothiazole, 4,5,6,7-tetrafluoro-2-methyl-1,3-benzothiazole, 2-(allyloxy)-1,3-benzothiazole 2-methyl-5-(methylthio)-1,3-benzothiazole, 2-(ethylthio)-1,3-benzothiazole, 2-(hexyloxy)-1,3-benzothiazole, dimethylbutoxy)-1,3-benzothiazole, 2-(octadecylthio)benzothiazole, 2-(1-ethylbutoxy)-1,3-benzothiazole, 2-(octyloxy)-1,3-benzothiazole, 2-(1-methylbutoxy)-1,3-benzothiazole, 2-(2-phenylethoxy)-1,3-benzothiazole, 2-[(1-methylheptyl)oxy]-1,3-benzothiazole 2-allyl-1,3-benzothiazole, 2-[(1-methylhexyl)oxy]-1,3-benzothiazole, 4-chloro-2-methoxy-1,3-benzothiazole, 2-(3-methylbutoxy)-1,3-benzothiazole, 4-chloro-2-(ethynyloxy)-1,3-benzothiazole, 2,5,6-trimethyl-1,3-benzothiazole, 4-methoxy-2,7-dimethyl-1,3-benzothiazole, 5,6-dimethoxy-2-methyl-1,3-benzothiazole, 2,5,7-trimethyl-1,3-benzothiazole, 2-(butylthio)-1,3-benzothiazole, 5-chloro-2-(ethylthio)-1,3-benzothiazole, 2-methyl-1,3-benzothiazole, 2-(undecylthio)-1,3-benzothiazole, 2-methyl-1,3-benzothiazole 5-methoxy-2-methylbenzothiazole, 2,5-dimethylbenzothiazole 6-methoxy-2-methylbenzothiazole, 2-methyl-5-benzothiazolol, 2-(methylmercapto)-benzothiazole, and 2-[(cyclohexylamino)thio]-benzothiazole).

The component containing at least two (meth)acrylate functional groups may be represented by the formula:

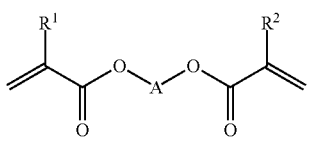

where A is a $C_4$ to $C_{30}$ aliphatic chain which can optionally comprise heteroatoms selected from O, N and S;
where the chain is optionally substituted with one or more acrylate or methacrylate functional groups, and/or one or more $C_1$-$C_{10}$ alkyl groups; and
where $R^1$ and $R^2$ may be the same or different and are each optionally selected from H and $C_1$ to $C_6$ alkyl. Suitably, A is an alkyl chain selected from the group consisting of butyl, pentyl, hexyl, heptyl, nonyl, decyl, undecyl or dodecyl.

For example, the component containing at least two (meth)acrylate functional groups may be selected from the group consisting of hexane diol diacrylate, hexane diol dimethacrylate, and di-trimethylolpropane tetraacrylate and combinations thereof.

Advantageously, the component containing at least two (meth)acrylate functional groups enhances the thermal and humid ageing performance of the cyanoacrylate curable compositions of the invention.

It is desirable that the component containing at least two (meth)acrylate functional groups is in the second part (b) of the two-part curable composition, because in addition to enhancing the thermal and humid ageing performance of the two-part composition, the storage stability of the cyanoacrylate composition may be unaffected, whereas, inclusion of said component in the first part (a) of the two-part curable composition may lead to a reduction in the storage stability of the cyanoacrylate composition. So while the thermal and humid ageing performance of said composition is improved irrespective of which part of the composition the component containing at least two (meth)acrylate functional groups is in and this improvement is desirable, it is further desirable nonetheless to have it in the second part of the composition to achieve greater storage stability.

Surprisingly, when the component comprising at least two (meth)acrylate functional groups (e.g. hexanediol diacrylate or hexanediol dimethacrylate) was present in the second part of the two-part composition, the thermal ageing performance was enhanced even more than when the component was placed in the first part of the two-part composition.

Advantageously, the component having at least two (meth)acrylate functional groups may be used to fulfil two roles when placed in the second part of the two part composition. In addition to enhancing the thermal ageing performance, particularly the humid ageing performance of the composition, the component may additionally be used as a carrier for the benzothiazole component. This obviates the requirement for an additional amount of a carrier or a separate carrier, such as glycerol triacetate, for the benzothiazole component. Hexanediol diacrylate and hexanediol dimethacrylate are particularly suitable components comprising at least two (meth)acrylate functional groups.

Suitably, when the component having at least two (meth)acrylate functional groups is employed as a carrier material for the benzothiazole, the total amount of plasticiser i.e. the total amount of the component having at least two (meth)acrylate functional groups and any additional carrier material for the benzothiazole, in the two-part composition is not more than about 20 wt % based on the total weight of the two-part curable composition, for example, the total amount of such plasticiser in the two-part composition is not more than about 18 wt %, or 16 wt % or 14 wt % or 12 wt %. When the total amount of plasticiser is greater than about 20 wt % based on the total weight of the two-part curable composition, a reduction in tensile strength is observed.

The component containing at least two (meth)acrylate functional groups may be present in an amount of from 1 to 20 wt %, such as from about 2 to about 18 wt %, suitably, from about 3 to about 17 wt %, for example from about 4 to about 16 wt %, or from about 4 to about 15 wt %, or from about 4 to about 14 wt % or from about 4 to about 13 wt % preferably in an amount of from 4 to 12 wt % based on the total weight of the composition. Humid ageing is particularly enhanced with maintenance of the tensile strength performance of the compositions of the invention when the component containing at least two (meth)acrylate functional groups is present in an amount of from 4 to 12 wt % based on the total weight of the composition.

The anhydride component may, for example, be selected from the group consisting of: phthalic anhydride, tetrahydrophthalic anhydride, itaconic anhydride or 4-methylphthalic anhydride.

The anhydride component may be present in an amount of from 0.1 to 5 wt %, preferably in an amount of from 0.1 to 2 wt % based on the total weight of the composition. The greatest enhancement of humid ageing is observed when the anhydride is present in an amount of from 0.1 to 2 wt % based on the total weight of the composition.

The benzonitrile compound may be selected from the group consisting of: tetrafluoroisophthalonitrile, 3,5-dinitrobenzonitrile; 2-chloro-3,5-dinitrobenzonitrile; pentafluorobenzonitrile; α,α,α-2-tetrafluoro-p-tolunitrile; and tetrachloroterphthalonitrile.

Suitably, the benzonitrile compound is present in an amount of from 0.05 to 5 wt %, more suitably in an amount of from 0.1 to 1 wt %, based on the total weight of the composition. Optimal cure is obtained when the benzonitrile compound is present in an amount of from 0.1 to 1 wt % based on the total weight of the composition.

Suitably in the compositions of the invention, the 2-substituted benzothiazole may be 5-chloro-2-methyl benzothiazole, the anhydride component may be selected from the group consisting of phthalic anhydride, tetrahydrophthalic anhydride, itaconic anhydride and 4-methylphthalic anhydride and combinations thereof, and the at least one benzonitrile compound may be selected from the group consisting of tetrafluoroisophthalonitrile or pentafluorobenzonitrile and combinations thereof. Such compositions have enhanced thermal performance in comparison to prior art compositions.

In the compositions of the invention, the benzonitrile component may be present in an amount of from 0.1 to 1 wt %, the anhydride may be present in an amount of from 0.1 to 2 wt % and the component containing at least two (meth)acrylate functional groups may be present in an amount of from 4 to 12 wt % based on the total weight of the composition. Such compositions have excellent thermal performance and humid ageing performance in comparison to prior art compositions.

In another aspect the present invention provides a two-part curable composition comprising:
(a) a first part comprising a cyanoacrylate composition comprising:
a cyanoacrylate component, and a rubber toughening agent comprised of (i) reaction products of the combination of ethylene, methyl acrylate and monomers having carboxylic acid cure sites, (ii) dipolymers of ethylene and methyl acrylate, and combinations of (i) and (ii); and (b) a second part comprising:

a 2-substituted benzothiazole or derivative thereof, wherein the 2-substitutent is a $C_{1-20}$ alkyl, a $C_{2-20}$ alkene, a $C_{8-20}$ alkylbenzyl, a $C_{1-20}$ alkylamino, a $C_{1-20}$ alkoxy, a $C_{1-20}$ alkylhydroxy, an ether, a sulfenamide, a $C_{1-20}$ thioalkyl or a $C_{1-20}$ thioalkoxy group; and where at least one of the first or second part further comprises:

an anhydride component; and where the second part further comprises:

a component containing at least two (meth)acrylate functional groups which is present in an amount of from 1 to 20 wt %, preferably in an amount of from 4 to 12 wt %, based on the total weight of the composition; and at least one benzonitrile compound substituted with at least two or more electron withdrawing groups selected from halo, —$NO_2$, or —CN and combinations thereof.

Suitably, the first part and the second part are in a ratio of a range of from about 1:1 to about 10:1. For example, the first part and the second part may be in a ratio of about 1:1, 2:1, 3:1, 4:1, 5:1, 6:1, 7:1, 8:1, 9:1 or 10:1.

In another aspect the present invention provides for the cured reaction product of a composition according to the invention.

In yet a further aspect the present invention provides a method for bonding together two substrate, comprising the steps of:

applying a two-part curable composition comprising:

(a) a first part comprising a cyanoacrylate composition comprising:

a cyanoacrylate component, and a rubber toughening agent comprised of (i) reaction products of the combination of ethylene, methyl acrylate and monomers having carboxylic acid cure sites, (ii) dipolymers of ethylene and methyl acrylate, and combinations of (i) and (ii); and (b) a second part comprising:

a 2-substituted benzothiazole or derivative thereof, wherein the 2-substitutent is a $C_{1-20}$ alkyl, $C_{2-20}$ alkene, a $C_{8-20}$ alkylbenzyl, a $C_{1-20}$ alkylamino, a $C_{1-20}$ alkoxy, a $C_{1-20}$ alkylhydroxy, an ether, a sulfenamide, a $C_{1-20}$ thioalkyl or a $C_{1-20}$ thioalkoxy group; and where at least one of the first or second part, further comprises:

a component containing at least two (meth)acrylate functional groups, at least one benzonitrile compound substituted with at least two or more electron withdrawing groups selected from halo, —$NO_2$, or —CN and combinations thereof, and at least one anhydride component;

to at least one of the substrates and mating together the substrates for a time sufficient to permit an adhesive bond to form from the cyanoacrylate composition between the mated substrates.

BRIEF DESCRIPTION OF THE DRAWINGS

Embodiments of the invention will be described, by way of example only, with reference to the accompanying drawings in which.

DETAILED DESCRIPTION

Figure 1:
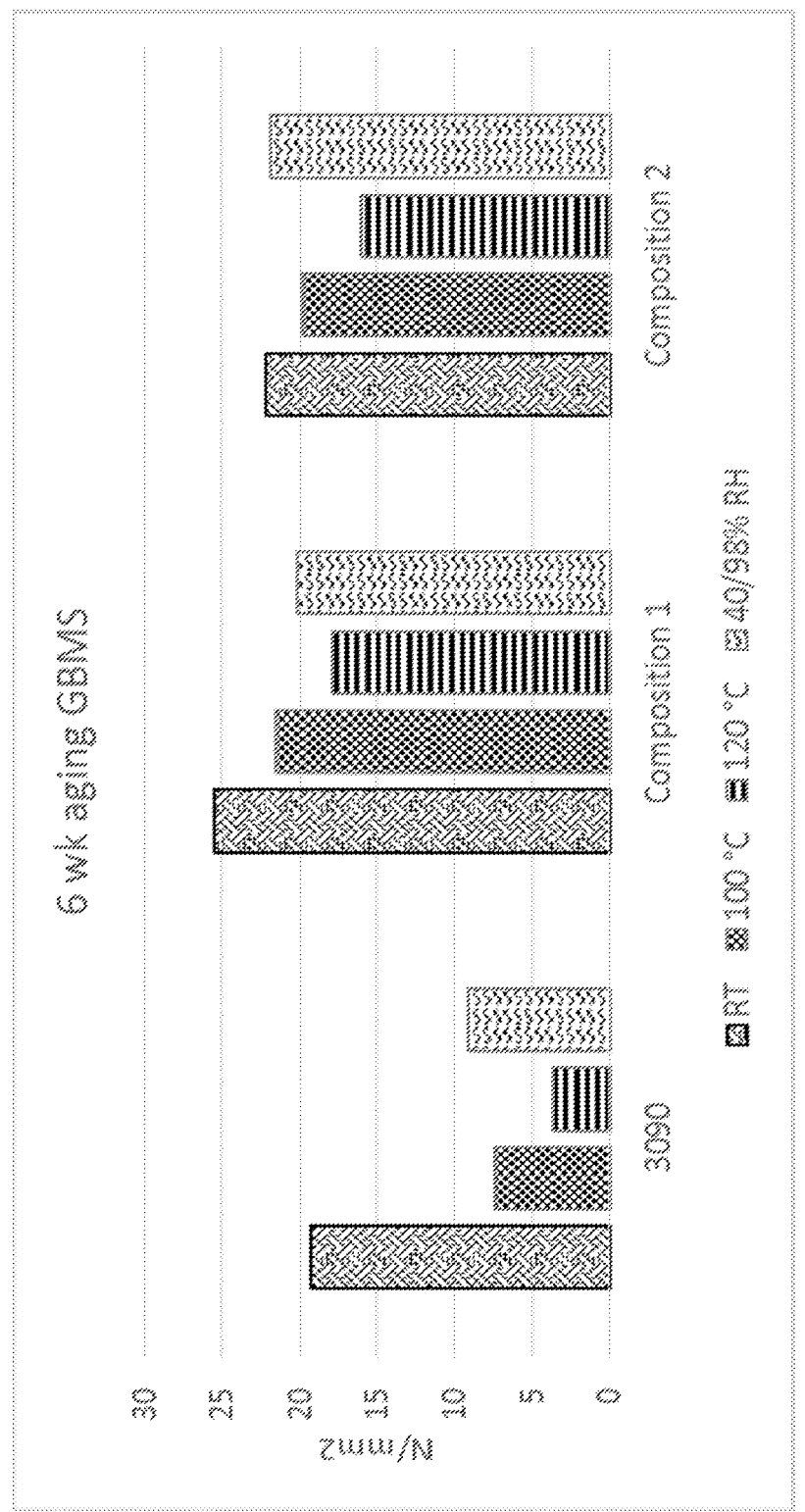
FIG. 1 shows the tensile strength performance of two-part cyanoacrylate compositions on grit blasted mild steel (GBMS) after heat ageing for 6 weeks at room temperature, at 100° C., and at 120° C.; and after humid ageing at 40° C. in 98% relative humidity.

The cyanoacrylate component includes at least one cyanoacrylate monomer which may be chosen with a raft of substituents, such as those represented by $H_2C$=$C(CN)$—COOR, where R is selected from $C_{1-15}$ alkyl, $C_{2-15}$ alkoxyalkyl, $C_{3-15}$ cycloalkyl, $C_{2-15}$ alkenyl, $C_{6-15}$ aralkyl, $C_{5-15}$ aryl, $C_{2-15}$ allyl and haloalkyl groups. Desirably, the cyanoacrylate monomer is selected from at least one of methyl cyanoacrylate, ethyl-2-cyanoacrylate, propyl cyanoacrylates, butyl cyanoacrylates (such as n-butyl-2-cyanoacrylate), octyl cyanoacrylates, allyl cyanoacrylate, β-methoxyethyl cyanoacrylate and combinations thereof. A particularly desirable cyanoacrylate monomer includes ethyl-2-cyanoacrylate.

The cyanoacrylate component should be included in the compositions in an amount within the range of from about 50% to about 99.98% by weight, with the range of about 70% to about 85% by weight, of the total composition being desirable.

The rubber toughening component may be chosen from one of several possibilities. One such possibility is a reaction product of the combination of ethylene, methyl acrylate and monomers having carboxylic acid cure sites. For example, the rubber toughening component may be an ethylene acrylic acid elastomer such as those available from Dupont™ under the trade name VAMAC, such as VAMAC N123 and VAMAC B-124. VAMAC N123 and VAMAC B-124 are reported by DuPont to be a master batch of ethylene/acrylic elastomer. The DuPont material VAMAC G is a similar copolymer, but contains no fillers to provide colour or stabilizers. VAMAC VCS rubber appears to be the base rubber, from which the remaining members of the VAMAC product line are compounded. VAMAC VCS (also known as VAMAC MR) is a reaction product of the combination of ethylene, methyl acrylate and monomers having carboxylic acid cure sites, which once formed is then substantially free of processing aids such as the release agents octadecyl amine, complex organic phosphate esters and/or stearic acid, and anti-oxidants, such as substituted diphenyl amine.

Recently, DuPont has provided to the market under the trade designation VAMAC VMX 1012 and VCD 6200, which are rubbers made from ethylene and methyl acrylate. It is believed that the VAMAC VMX 1012 rubber possesses little to no carboxylic acid in the polymer backbone. Like the VAMAC VCS rubber, the VAMAC VMX 1012 and VCD 6200 rubbers are substantially free of processing aids such as the release agents octadecyl amine, complex organic phosphate esters and/or stearic acid, and anti-oxidants, such as substituted diphenyl amine, noted above. All of these VAMAC elastomeric polymers are useful herein.

In one variation, the so-formed reaction product is rendered substantially free of processing aids and anti-oxidants. The processing aids are release agents such as octadecyl amine (reported by DuPont™ to be available commercially from Akzo Nobel under the trade name ARMEEN® 18D), complex organic phosphate esters (reported by DuPont to be available commercially from R.T. Vanderbilt Co., Inc. under the trade name VANFRE VAM), stearic acid and/or polyethylene glycol ether wax. The anti-oxidant is a substituted diphenyl amine (reported by DuPont to be available commercially from Uniroyal Chemical under the trade name NAUGARD® 445).

Alternatively, the rubber toughening component is a dipolymer of ethylene and methyl acrylate. In one variation of this alternative, the so-formed dipolymer is rendered substantially free of processing aids and anti-oxidants. Of course, the rubber toughening agent may be a combination of the reaction product of the preceding paragraph and the dipolymer of this paragraph, either of which or both may be rendered substantially free of processing aids and anti-oxidants.

The rubber toughening component should be present in a concentration of about 1.5% to about 20% by weight based on the total weight of the composition, such as about 5% to about 15% by weight, with about 8% to about 10% being particularly desirable.

Advantageously, when the rubber toughening component is present in an amount of from about 5% to about 15% by weight based on the total weight of the composition, the compositions of the invention have enhanced flexibility and toughness.

The component containing at least two (meth)acrylate functional groups should be an aliphatic compound having at least two (meth)acrylate functional groups, preferably at the terminal ends of the aliphatic chain, though pendant along the aliphatic chain is appropriate as well, particularly where more than two (meth)acrylate functional groups are present. Alkane di- and tri-ol di- and tri-(meth)acrylates, respectively, are a few examples of such compounds. More specifically, hexanediol dimethacrylate and hexanediol diacrylate are desirable. In addition, di-trimethylolpropane tetraacrylate and trimethylolpropane trimethacrylate are also desirable.

For example the component containing at least two (meth) acrylate functional groups may have the following formula:

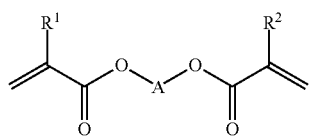

where A is a $C_4$ to $C_{30}$ aliphatic chain which can optionally comprise heteroatoms selected from O, N and S, and where the chain is optionally substituted with one or more acrylate and/or methacrylate functional groups, and/or one or more $C_1$-$C_{10}$ alkyl groups; and wherein $R^1$ and $R^2$ may be the same or different and are each optionally selected from H and $C_1$ to $C_6$ alkyl.

Suitably the component having at least two (meth)acrylate functional groups has the formula:

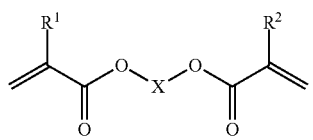

where $R^1$ and $R^2$ are the same or different and are selected from H or Me; and wherein X is a $C_4$ to $C_{30}$ alkyl chain which can optionally comprise heteroatoms selected from O, N and S and where the chain is optionally substituted with one or more acrylate and/or methacrylate functional groups, and/or one or more $C_1$-$C_{10}$ alkyl groups.

X may be a $C_4$ to $C_{30}$ alkyl chain, for example X may be a $C_4$ alkyl chain, or a $C_5$ alkyl chain, or a $C_6$ alkyl chain, or a $C_7$ alkyl chain, or a $C_8$ alkyl chain, or a $C_9$ alkyl chain, or a $C_{10}$ alkyl chain, or a alkyl chain, or a $C_{12}$ alkyl chain. Suitably, X may be an alkyl chain selected from the group consisting of: butyl, pentyl, hexyl, heptyl, octyl, nonyl, decyl, undecyl, or dodecyl chain.

Suitably, such a component imparts the compositions of the invention with improved thermal performance and humid ageing performance.

The component having at least two (meth) acrylate functional groups may be selected from:

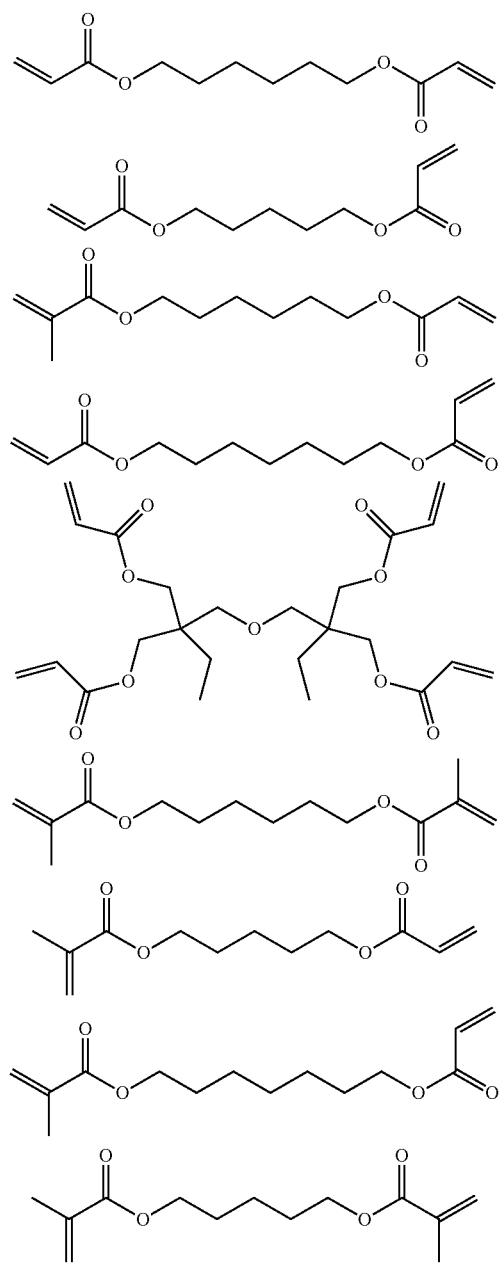

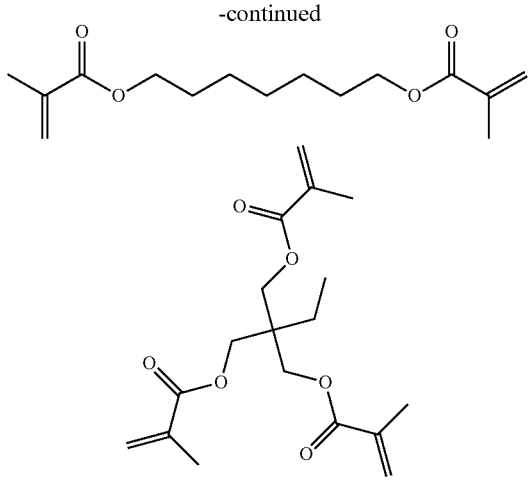

The component containing at least two (meth)acrylate functional groups should be present in a concentration of about 0.5 to about 20 wt %, such as about 1 to about 15 wt %, with about 4 to about 12 wt % being particularly desirable. When the component containing at least two (meth)acrylate functional groups is present in an amount greater than about 20 wt %, the tensile strength of the composition is reduced. When the component is present in an amount less than about 1 wt % the improvement in humid ageing is reduced. When the component is present in an amount of from about 4 to about 12 wt % the greatest enhancement in humid ageing is observed with maintenance of tensile strength performance. Advantageously, the component containing at least two (meth)acrylate functional groups acts as an active plasticiser, in addition to improving the humid ageing performance of the two part composition, it can function as a carrier for the benzothiazole component, thereby obviating the requirement for including additional carriers.

The anhydride component should be an aromatic one like phthalic anhydride or full or partially hydrogenated versions thereof, though other anhydrides may be used with or without phthalic anhydride (or its full or partially hydrogenated versions thereof).

For example, the anhydride component may suitably be selected from phthalic anhydride, tetrahydrophthalic anhydride, 4-methylphthalic anhydride, itaconic anhydride, diphenic anhydride, phenylsuccinic anhydride, 1,8 naphthalic anhydride, bromomaleic anhydride, 2,3-dichloromaleic anhydride, 2-dodecen-1-yl-succinic anhydride, homophthalic anhydride, tetrabromophthalic anhydride, bicyclo[2,2,2]oct-7-ene 2,3,5,6-tetracarboxylic dianhydride, 3-fluorophthalic anhydride, 3,3,4,4-benzophenone tetracarboxylic dianhydride, 3-nitrophthalic anhydride, 3,3,4,4-biphenyltetracarboxylic dianhydride, pyromellitic dianhydride, 1,4,5,8 naphthalene tetracarboxylic dianhydride, methacrylic anhydride, citraconic anhydride, hexahydro-4-methylphthalic anhydride, maleic anhydride, 2,3-diphenylmaleic anhydride, hexafluoroglutaric anhydride, 2,3-dimethylmaleic anhydride, tetrafluorophthalic anhydride, 1,2-cyclohexanedicarboxylic anhydride, glutaric anhydride, bromomaleic anhydride, 1,4,5,8-napthalenetetracarboxylicacid dianhydride, 1,2,4-benzenetricarboxylic anhydride, exo-3,6-epoxy-1,2,3,6-tetrahydrophthalic anhydride, di-O-acetyl-L-tartaric anhydride, 1,2,4,5-benzenetetracarboxylic dianhydride, 1,2,4-benzenetricarboxylic anhydride and combinations thereof. Suitably, the anhydride component is phthalic anhydride, tetrahydrophthalic anhydride, itaconic anhydride or 4-methylphthalic anhydride.

The anhydride component should be present in a concentration of about 0.1 to about 5 wt %, such as about 0.1 to about 2 wt %, with about 0.5 wt % based on the total weight of the composition being particularly desirable. When the anhydride component is present in a concentration of greater than about 5 wt % based on the total weight of the composition no further improvement in performance is observed. When the anhydride component is present in less than 0.1 wt % based on the total weight of the composition, the improvement in humid ageing performance is not as pronounced.

Thermal resistance conferring agents may also be added. Included among such agents are certain sulfur-containing compounds, such as sulfonates, sulfinates, sulfates and sulfites as set forth in U.S. Pat. No. 5,328,944 (Attarwala), the disclosure of which is hereby expressly incorporated herein by reference.

For example, compositions of the invention may optionally comprise additives which confer thermal resistance properties such as 2-sulfobenzoic acid anhydride, triethylene glycol di(p-toluene sulfonate), trifluoroethyl p-toluene sulfonate, dimethyl dioxolen-4-ylmethyl p-toluene sulfonate, p-toluene sulfonic anhydride, methanesulfonic anhydride, 1,3 propylene sulfite, dioxathiolene dioxide, 1,8-naphthosultone, sultone 1,3-propane, sultone 1,4-butene, allyl phenyl sulfone, 4-fluorophenyl sulfone, dibenzothiophene sulfone, bis(4-fluorophenyl) sulfone, ethyl p-toluenesulfonate, and trifluoromethanesulfonic anhydride.

Accelerators may be included in the inventive cyanoacrylate compositions, such as any one or more selected from calixarenes and oxacalixarenes, silacrowns, crown ethers, cyclodextrins, poly(ethyleneglycol) di(meth)acrylates, ethoxylated hydric compounds and combinations thereof.

Of the calixarenes and oxacalixarenes, many are known, and are reported in the patent literature. See e.g. U.S. Pat. Nos. 4,556,700, 4,622,414, 4,636,539, 4,695,615, 4,718,966, and 4,855,461, the disclosures of each of which are hereby expressly incorporated herein by reference.

For instance, as regards calixarenes, those within the following structure are useful herein:

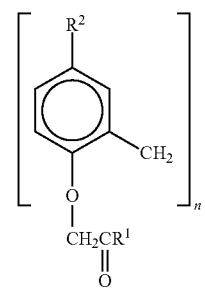

where $R^1$ is $C_{1-10}$ alkyl, $C_{1-10}$ alkoxy, substituted $C_{1-10}$ alkyl or $C_{1-10}$ substituted alkoxy; $R^2$ is H or $C_{1-10}$ alkyl; and n is 4, 6 or 8.

One particularly desirable calixarene is tetrabutyl tetra[2-ethoxy-2-oxoethoxy]calix-4-arene.

A host of crown ethers are known. For instance, examples which may be used herein either individually or in combination, or in combination with other first accelerator include 15-crown-5, 18-crown-6, dibenzo-18-crown-6, benzo-15-crown-5-dibenzo-24-crown-8, dibenzo-30-crown-10, tribenzo-18-crown-6, asym-dibenzo-22-crown-6, dibenzo-14-crown-4, dicyclohexyl-18-crown-6, dicyclohexyl-24-crown-8, cyclohexyl-12-crown-4, 1,2-decalyl-15-crown-5, 1,2-naphtho-15-crown-5, 3,4,5-naphtyl-16-crown-5, 1,2-methyl-benzo-18-crown-6, 1,2-methylbenzo-5, 6-methyl-benzo-18-crown-6, 1,2-t-butyl-18-crown-6, 1,2-vinylbenzo-15-crown-5, 1,2-vinylbenzo-18-crown-6, 1,2-t-butyl-cyclohexyl-18-crown-6, asym-dibenzo-22-crown-6 and 1,2-benzo-1,4-benzo-5-oxygen-20-crown-7. See U.S. Pat. No. 4,837,260 (Sato), the disclosure of which is hereby expressly incorporated here by reference.

Of the silacrowns, again many are known, and are reported in the literature. For instance, a typical silacrown may be represented within the following structure:

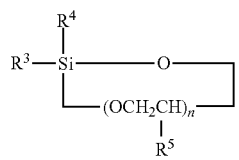

where $R^3$ and $R^4$ are organo groups which do not themselves cause polymerization of the cyanoacrylate monomer, $R^5$ is H or $CH_3$ and n is an integer of between 1 and 4. Examples of suitable $R^3$ and $R^4$ groups are R groups, $C_{1-20}$ alkoxy groups, such as methoxy, and aryloxy groups, such as phenoxy. The $R^3$ and $R^4$ groups may contain halogen or other substituents, an example being trifluoropropyl. However, groups not suitable as $R^4$ and $R^5$ groups are basic groups, such as amino, substituted amino and alkylamino.

Specific examples of silacrown compounds useful in the inventive compositions include:

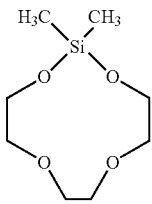

dimethylsila-11-crown-4;

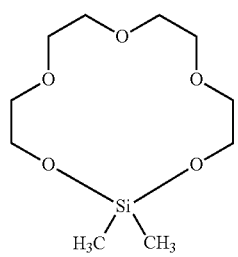 [SMILES: C[Si]1(C)OCCOCCOCCOCCO1]

dimethylsila-14-crown-5;

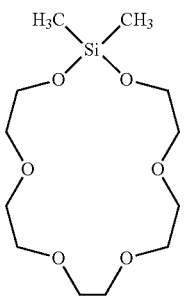 [SMILES: C[Si]1(C)OCCOCCOCCOCCOCCO1]

and dimethylsila-17-crown-6.

See e.g. U.S. Pat. No. 4,906,317 (Liu), the disclosure of which is hereby expressly incorporated herein by reference.

Many cyclodextrins may be used in connection with the present invention. For instance, those described and claimed in U.S. Pat. No. 5,312,864 (Wenz), the disclosure of which is hereby expressly incorporated herein by reference, as hydroxyl group derivatives of an α, β or γ-cyclodextrin which is at least partly soluble in the cyanoacrylate would be appropriate choices.

For instance, poly(ethylene glycol) di(meth)acrylates suitable for use herein include those within the following structure:

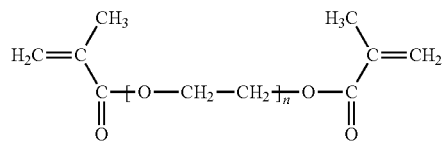

where n is greater than 3, such as within the range of 3 to 12, with n being 9 as particularly desirable. More specific examples include PEG 200 DMA, (where n is about 4) PEG 400 DMA (where n is about 9), PEG 600 DMA (where n is about 14), and PEG 800 DMA (where n is about 19), where the number (e.g., 400) represents the average molecular weight of the glycol portion of the molecule, excluding the two methacrylate groups, expressed as grams/mole (i.e., 400 g/mol). A particularly desirable PEG DMA is PEG 400 DMA.

And of the ethoxylated hydric compounds (or ethoxylated fatty alcohols that may be employed), appropriate ones may be chosen from those within the following structure:

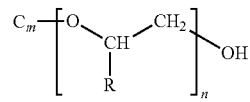

where $C_m$ can be a linear or branched alkyl or alkenyl chain, m is an integer between 1 to 30, such as from 5 to 20, n is an integer between 2 to 30, such as from 5 to 15, and R may be H or alkyl, such as $C_{1-6}$ alkyl.

Commercially available examples of materials within the above structure include those offered under the DEHYDOL® tradename from BASF SE, Ludwigshafen, Germany.

When used, the accelerator embraced by the above structures should be included in the compositions in an amount within the range of from about 0.01% to about 10% by weight, with the range of about 0.1 to about 0.5% by weight being desirable, and about 0.4% by weight of the total composition being particularly desirable.

A stabilizer package is also ordinarily found in cyanoacrylate compositions. The stabilizer package may include one or more free radical stabilizers and anionic stabilizers, each of the identity and amount of which are well known to those of ordinary skill in the art. See e.g. U.S. Pat. Nos. 5,530,037 and 6,607,632, the disclosures of each of which are hereby incorporated herein by reference.

Commonly used free-radical stabilizers include hydroquinone, while commonly used anionic stabilizers include boron triflouride, boron trifluoride-etherate, sulphur trioxide (and hydrolyis products thereof), sulfur dioxide and methane sulfonic acid.

Other additives may be included to confer additional physical properties, such as improved shock resistance (for instance, citric acid), thickness (for instance, polymethyl methacrylate), thixotropy (for instance fumed silica), and color.

These other additives may be used in the inventive compositions individually in an amount from about 0.05% to about 20%, such as about 1% to 15%, desirably 5% to 10% by weight, depending of course on the identity of the additive. For instance, and more specifically, citric acid may be used in the inventive compositions in an amount of 5 to 500 ppm, desirably 10 to 100 ppm.

EXAMPLES

The components of representative compositions according to the invention are specified in Table 1.

TABLE 1

|  | Composition | |
| --- | --- | --- |
|  | 1<br>Amt (% wt) | 2<br>Amt (% wt) |
| Part A | | |
| Flexible CA | 98.5 | 98.5 |
| Tetrafluoroisophthalonitrile (TFIPN) | 1 | 1 |
| Itaconic anhydride | 0.5 | |
| 4-methylphthalic anhydride | | 0.5 |
| Part B | | |
| Hexanediol diacrylate (HDDA) | 97.75 | 97.75 |
| Silica | 2 | 2 |
| 5-chloro-2-methylbenzothiazole | 0.25 | 0.25 |

The flexible CA component comprises: ethyl-2-cyanoacrylate, a rubber toughening agent comprised of (i) reaction products of the combination of ethylene, methyl acrylate and monomers having carboxylic acid cure sites, (ii) dipolymers of ethylene and methyl acrylate, and combinations of (i) and (ii), and a stabilizer. The rubber toughening agent used may be any of those described herein, though in this example it is the one provided under the trade name VAMAC® VCS 5500. The stabilizer used here is a combination of methane sulfonic acid and $SO_2$. The ethyl-2-cyanoacrylate is present in greater than 80 wt % and the rubber toughening agent is present in 6 wt % based on the total weight of the flexible CA composition. In the compositions of Table 1 the ratio of the first part (Part A) to the second part (Part B) is 10:1, although other ratios could also be used.

A given cyanoacrylate composition is applied to the end region of a first lap shear substrate (25.4 mm×101.6 mm×1.6 mm), a second substrate of the same size is mated to the first substrate at the application area with said composition between said first and second substrates. The substrates are mated for a time sufficient to permit an adhesive bond to form from the cyanoacrylate composition between the mated substrates. The area of overlap of the substrates is 0.5 inches squared or 322.6 $mm^2$. The mated substrates are cured at room temperature for 1 week prior to testing the tensile strength performance of the bonds under specific conditions.

Tensile strengths were determined according to ASTM D 1002 for the determination of shear strength of adhesives using lap shear specimens.

The tensile strength of compositions 1 and 2 of Table 1 were evaluated on GBMS after ageing for 3 and 6 weeks at various temperatures. The tensile strength of Compositions 1 and 2 were compared to that of Loctite® 3090 [Part A: Ethyl-2-cyanoacrylate (>80 wt %), and Part B: Activator].

Loctite® 3090 is a two component, fast curing, and gap filling adhesive with excellent bonding characteristics to a variety of substrates including plastics, rubbers and metals. Loctite® 3090 is designed for the assembly of parts with varying or undefined bond gaps (up to 5 mm), or for applications where complete cure of excess adhesive is a requirement. The gel consistency prevents adhesive flow even on vertical surfaces. Loctite 3090 is also suited for bonding porous materials such as wood, paper, leather and fabric.

TABLE 2

|  | Composition | | |
| --- | --- | --- | --- |
|  | 3090 | 1 | 2 |
| RT Ageing GBMS | | | |
| 3 wks | 21.4 ± 0.6 | 19.4 ± 2.0 | 23.0 ± 1.6 |
| 6 wks | 19.3 ± 1.4 | 25.5 ± 1.6 | 22.2 ± 1.4 |
| 100° C. Ageing GBMS | | | |
| 3 wks | 10.5 ± 1.2 | 21.2 ± 3.6 | 19.8 ± 1.8 |
| 6 wks | 7.4 ± 1.3 | 21.5 ± 2.5 | 19.8 ± 2.8 |
| 120° C. Ageing GBMS | | | |
| 3 wks | 6.1 ± 0.4 | 16.9 ± 1.5 | 21.2 ± 2.5 |
| 6 wks | 3.6 ± 0.5 | 17.8 ± 1.4 | 16.0 ± 1.6 |
| 40° C./98% RH GBMS | | | |
| 3 wks | 10.7 ± 0.5 | 19.3 ± 2.0 | 19.5 ± 2.2 |
| 6 wks | 9.1 ± 0.7 | 20.1 ± 1.6 | 21.8 ± 0.4 |

Heat ageing and humid ageing performance of ethyl-2-cyanoacrylate compositions is shown in Table 2. Compositions 1 and 2 demonstrated enhanced tensile strength performance when aged at each of 100° C. and 120° C., for 3 and 6 week periods.

The tensile strength for each composition was determined on GBMS substrate after heat ageing at 40° C. at 98% relative humidity for 3 and 6 week periods. Compositions 1 and 2 demonstrated excellent thermal performance after ageing in humid conditions.

The combination of the rubber toughening agent, the benzonitrile component, the anhydride component, the component containing at least two (meth)acrylate functional groups, and the 2-substituted benzothiazole component in the cyanoacrylate component, afford the compositions of the invention superior thermal aged tensile strength performance and enhanced humid ageing performance over prior art cyanoacrylate compositions.

By way of comparison various combinations of component additives were assessed in two-part cyanoacrylate compositions. Two-part compositions comprising various additives were prepared as specified in Table 3. In the compositions of Table 3 the ratio of the first part to the second part is 10:1.

TABLE 3

| Component | Amt (% wt) | | | | | |
|---|---|---|---|---|---|---|
| | 3 | 4 | 5 | 6 | 7 | 8 |
| Part A | | | | | | |
| Flexible CA | 99.41 | 99 | 99 | 98 | 98 | 98 |
| Pentafluorobenzonitrile | 0.5 | 1 | | | | |
| Tetrahydrophthalic anhydride | 0.09 | | | | | |
| Tetrafluoroisophthalonitrile | | | 1 | 1 | 1 | 1 |
| Itaconic anhydride | | | | 1 | | |
| Phthalic anhydride | | | | | 1 | |
| 4-Methylphthalic anhydride | | | | | | 1 |
| Part B | | | | | | |
| glycerol triacetate (GTA) | 99.75 | 99.75 | 99.75 | 99.75 | 99.75 | 99.75 |
| 5-chlro-2-methylbenzothiazole (5-Cl-2-MeBT) | 0.25 | 0.25 | 0.25 | 0.25 | 0.25 | 0.25 |

The flexible CA component comprises: ethyl-2-cyanoacrylate, a rubber toughening agent comprised of (i) reaction products of the combination of ethylene, methyl acrylate and monomers having carboxylic acid cure sites, (ii) dipolymers of ethylene and methyl acrylate, and combinations of (i) and (ii), and a stabilizer. The rubber toughening agent used is the one provided under the trade name VAMAC® VCS 5500. The stabilizer used here is a combination of methane sulfonic acid and $SO_2$. The ethyl-2-cyanoacrylate is present in greater than 80 wt % and the rubber toughening agent is present in 6 wt % based on the total weight of the flexible CA composition.

Figure 2:
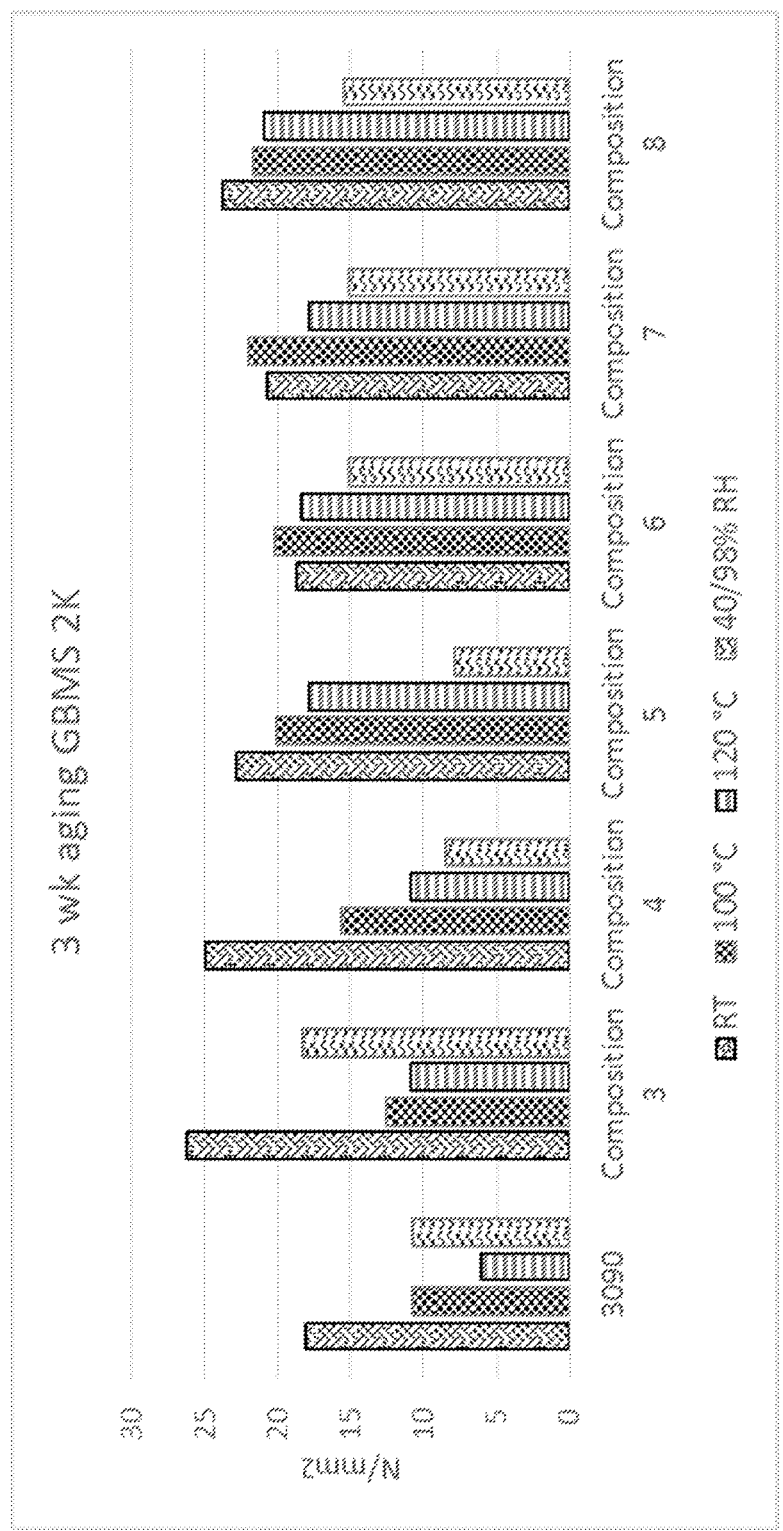
FIG. 2 shows the tensile strength performance of two-part cyanoacrylate compositions on grit blasted mild steel (GBMS) after heat ageing for 3 weeks at room temperature, at 100° C., and at 120° C.; and after humid ageing at 40° C. in 98% relative humidity.

Compositions 6 to 8 demonstrated improved tensile strength performance on GBMS after ageing at each of 100° C. and 120° C. for 3 weeks. Said compositions also demonstrated an improvement in tensile strength performance after heat ageing in humid conditions for 3 weeks. However, when the performance of each of the comparative compositions is compared with tensile strength performance of compositions 1 and 2, the enhanced effect of the compositions of the invention is apparent. The presence of the component comprising at least two (meth)acrylate functional groups, in concert with the benzothiazole component, the anhydride component and the rubber toughening agent, results in an unexpected enhancement in thermal performance of the cyanoacrylate compositions of the invention. As can be seen from Table 4 and FIG. 2, tetrafluoroisophthalonitrile (TFIPN) is a particularly preferred additive.

Figure 3:
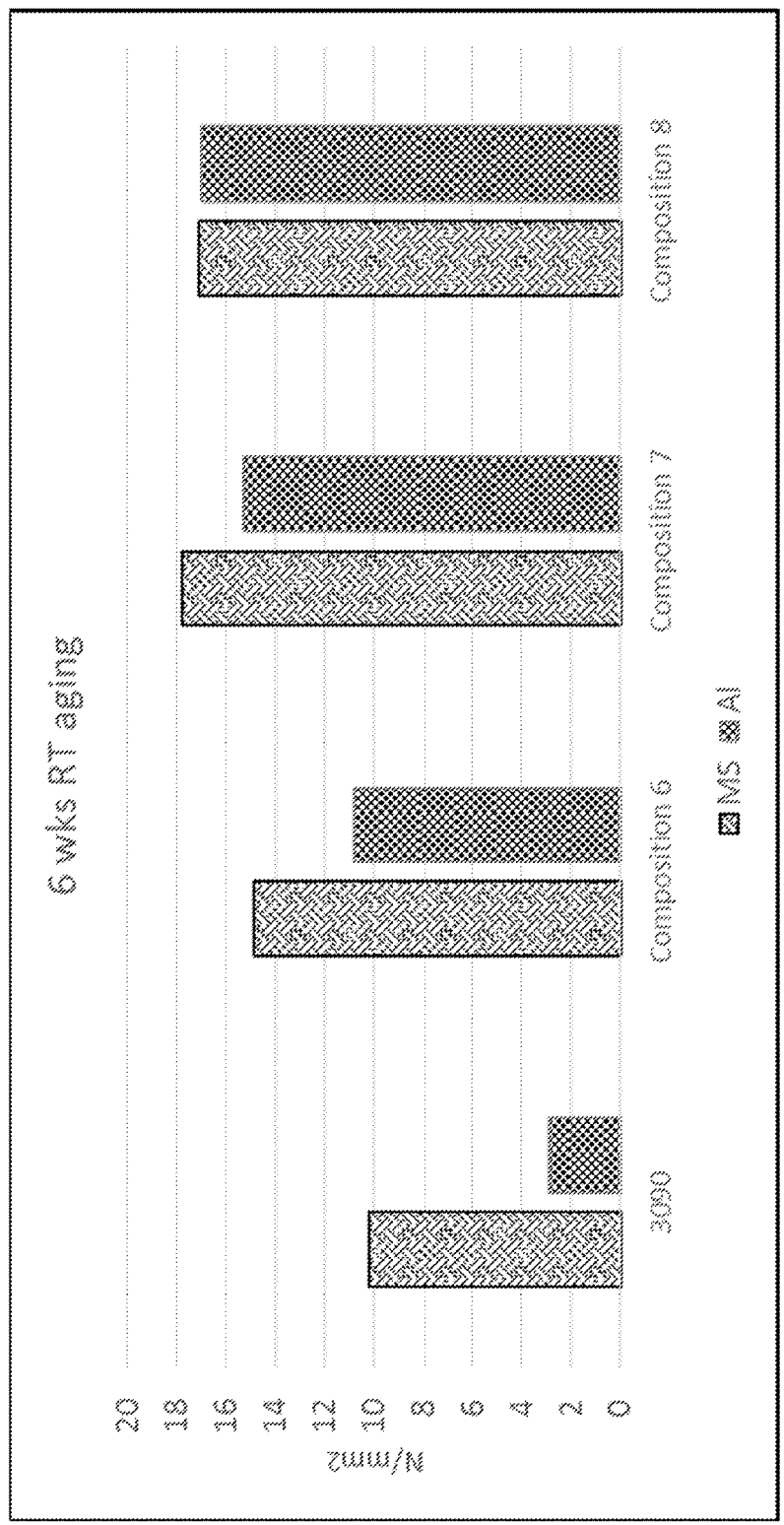
FIG. 3 shows the tensile strength performance of two-part cyanoacrylate compositions on mild steel (MS) and aluminium substrates after ageing for 6 weeks at room temperature.

The tensile strength performance of compositions 6 to 8 and of LOCTITE® 3090 were also assessed on mild steel (MS) and aluminium (Al) substrates after ageing for 6 weeks at room temperature (see FIG. 3). Compositions 6 to 8 demonstrated superior tensile strength on both MS and Al substrates after ageing at room temperature for 6 weeks.

The activator component for the compositions of Table 3 comprises glycerol triacetate and 5-chloro-2-methylbenzothiazole. The compositions of Table 3 do not comprise a component comprising at least two (meth)acrylate functional groups. When the compositions of Table 3 are compared with compositions 1 and 2 of Table 1 and 2, the presence of the component comprising at least two (meth)acrylate functional groups can be seen to significantly enhance thermal performance of the compositions of the invention. Surprisingly, when the component comprising at least two (meth)acrylate functional groups (i.e. hexane diol diacrylate) was present in the second part of the two-part composition, the thermal age performance was enhanced even further than when said component was placed in the first part of the two-part composition. Hexanediol diacrylate and hexanediol dimethacrylate are particularly preferred components comprising at least two (meth)acrylate functional groups.

TABLE 4

| | 3090 | 3 | 4 | 5 | 6 | 7 | 8 |
|---|---|---|---|---|---|---|---|
| Plastic Bonding (½ inch overlap, SF unless noted) (N/mm2) | | | | | | | |
| PC | 7.2 ± 2.1 | 10.3 ± 2.1 | 7.8 ± 0.5 | 7.3 ± 0.8 | 7.3 ± 1.4 | 6.4 ± 0.8 | 7.4 ± 1.2 |
| PVC | 5.6 ± 1.7 | 6.2 ± 0.9 | 5.4 ± 0.3 | 6.5 ± 1.1 | 4.7 ± 1.1 | 4.5 ± 1.6 | 5.5 ± 0.6 |
| PXPMMA | 5.8 ± 1.0 | 6.7 ± 1.1 | 7.1 ± 0.9 | 6.7 ± 0.2 | 6.2 ± 0.5 | 5.7 ± 1.0 | 7.0 ± 0.7 |
| RT aging GBMS (N/mm2) | | | | | | | |
| 3 wks RT GBMS | 18.1 ± 1.6 | 26.2 ± 1.4 | 25.0 ± 0.1 | 22.8 ± 0.5 | 18.7 ± 2.4 | 20.7 ± 3.1 | 23.8 ± 1.5 |
| 3 wks 100 deg GBMS | 10.7 ± 1.4 | 12.5 ± 3.4 | 15.6 ± 1.7 | 20.1 ± 1.9 | 20.2 ± 1.4 | 22.0 ± 2.3 | 21.7 ± 1.2 |
| 3 wks 120 deg GBMS | 6.1 ± 0.4 | 10.8 ± 1.7 | 10.8 ± 1.9 | 17.8 ± 2.2 | 18.4 ± 2.3 | 17.9 ± 3.0 | 20.9 ± 2.6 |
| 3 wks 40/98% RH | 10.7 ± 0.8 | 18.3 ± 1.5 | 8.5 ± 1.0 | 7.9 ± 2.0 | 15.1 ± 2.1 | 15.1 ± 2.3 | 15.4 ± 1.0 |
| Gel times | | | | | | | |
| ~1 g dispense | 4 min 19 sec | 5 min 18 sec | 6 min 14 sec | 6 min 46 sec | 7 min 4 sec | 5 min 1 sec | 7 min 1 sec |

The tensile strength performance of compositions 3 to 8 and of LOCTITE® 3090 on polycarbonate (PC), polyvinyl chloride (PVC) and on polymethylmethacrylate ((Perspex), PX PMMA) substrates was determined (See Table 4). Furthermore, the tensile strength performance of compositions 3 to 8 and of LOCTITE® 3090 on GBMS was assessed after heat ageing at room temperature and each of 100° C. and 120° C., for 3 weeks (see FIG. 2). Each of compositions 3 to 8 demonstrated enhanced tensile strength performance on GBMS after ageing at room temperature for 3 weeks.

The compositions of the invention also demonstrated enhanced flexibility and toughness when compared with prior art compositions.

The words "comprises/comprising" and the words "having/including" when used herein with reference to the present invention are used to specify the presence of stated features, integers, steps or components but do not preclude the presence or addition of one or more other features, integers, steps, components or groups thereof.

The invention claimed is:
1. A two-part curable composition comprising:
(a) a first part comprising a cyanoacrylate composition comprising:
a cyanoacrylate component, and
a rubber toughening agent comprised of (i) reaction products of the combination of ethylene, methyl acrylate and monomers having carboxylic acid cure sites, (ii) dipolymers of ethylene and methyl acrylate, and combinations of (i) and (ii); and
(b) a second part comprising:
a 2-substituted benzothiazole or derivative thereof, wherein the 2-substitutent is a $C_{1-20}$ alkyl, a $C_{2-20}$ alkene, a $C_{8-20}$ alkylbenzyl, a $C_{1-20}$ alkylamino, a $C_{1-20}$ alkoxy, a $C_{1-20}$ alkylhydroxy, an ether, a sulfenamide, a $C_{1-20}$ thioalkyl or a $C_{1-20}$ thioalkoxy group; and
wherein at least one of the first or the second part further comprises one or more of:
a component containing at least two (meth)acrylate functional groups,
at least one benzonitrile compound substituted with at least two or more electron withdrawing groups selected from halo, —$NO_2$, or —CN and combinations thereof, and
at least one anhydride component.

2. The two-part curable composition according to claim 1 wherein the cyanoacrylate component is represented by $H_2C$=$C(CN)$—COOR, wherein R is selected from $C_{1-15}$ alkyl, $C_{2-15}$ alkoxyalkyl, $C_{3-15}$ cycloalkyl, $C_{2-15}$ alkenyl, $C_{6-15}$ aralkyl, $C_{5-15}$ aryl, $C_{3-15}$ allyl and $C_{1-15}$ haloalkyl groups.

3. The two-part curable composition according to claim 2, wherein the cyanoacrylate component comprises ethyl-2-cyanoacrylate.

4. The two-part curable composition according to claim 1, wherein the 2-substituted benzothiazole is further substituted with at least one halo, $C_{1-20}$ thioalkyl, $C_{1-20}$ haloalkyl, $C_{1-20}$ alkyl, $C_{1-20}$ alkoxy or hydroxyl substituent.

5. The two-part curable composition according to claim 4, wherein the halo substituent is Cl, F or Br.

6. The two-part curable composition according to claim 1, wherein the 2-substituted benzothiazole is selected from the group consisting of: 5-chloro-2-methyl benzothiazole, 5-bromo-2-methyl-1,3-benzothiazole, 2-[(tert-butylamino)thio]-1,3-benzothiazol-5-ol, 5,6-dichloro-2-methyl-1,3-benzothiazole, 6-bromo-2-methyl-1,3-benzothiazole, 5-fluoro-2-methyl-1,3-benzothiazole, 6,7-dichloro-2-methyl-1,3-benzothiazole, 2,5-dimethyl-1,3-benzothiazole, 4,5,6,7-tetrafluoro-2-methyl-1,3-benzothiazole, 4,5,6,7-tetrafluoro-2-methyl-1,3-benzothiazole, 2-(allyloxy)-1,3-benzothiazole 2-methyl-5-(methylthio)-1,3-benzothiazole, 2-(ethylthio)-1,3-benzothiazole, 2-(hexyloxy)-1,3-benzothiazole, 2-(1,3-dimethylbutoxy)-1,3-benzothiazole, 2-(Octadecylthio)benzothiazole, 2-(1-ethylbutoxy)-1,3-benzothiazole, 2-(octyloxy)-1,3-benzothiazole, 2-(1-methylbutoxy)-1,3-benzothiazole, 2-(2-phenylethoxy)-1,3-benzothiazole, 2-[(1-methylheptyl)oxy]-1,3-benzothiazole 2-allyl-1,3-benzothiazole, 2-[(1-methylhexyl)oxy]-1,3-benzothiazole, 4-chloro-2-methoxy-1,3-benzothiazole, 2-(3-methylbutoxy)-1,3-benzothiazole, 4-chloro-2-(ethynyloxy)-1,3-benzothiazole, 2,5,6-trimethyl-1,3-benzothiazole, 4-methoxy-2,7-dimethyl-1,3-benzothiazole, 5,6-dimethoxy-2-methyl-1,3-benzothiazole, 2,5,7-trimethyl-1,3-benzothiazole, 2-(butylthio)-1,3-benzothiazole, 5-chloro-2-(ethylthio)-1,3-benzothiazole, 2-methyl-1,3-benzothiazole, 2-(undecylthio)-1,3-benzothiazole, 2-methyl-1,3-benzothiazole 5-methoxy-2-methylbenzothiazole, 2,5-dimethylbenzothiazole 6-methoxy-2-methylbenzothiazole, 2-methyl-5-benzothiazolol, 2-(methylmercapto)-benzothiazole, and 2-[(cyclohexylamino)thio]-benzothiazole).

7. The two-part curable composition according to claim 6, wherein the 2-substituted benzothiazole is selected from the group consisting of: 5-chloro-2-methyl benzothiazole, 2-methyl-1,3-benzothiazole, 2-(methylmercapto)-benzothiazole, 5-methoxy-2-methylbenzothiazole, 6-methoxybenzothiazole, 2,5-dimethylbenzothiazole and 2-methyl-5-benzothiazolol.

8. The two-part curable composition according to claim 1, wherein the component containing at least two (meth)acrylate functional groups is represented by the formula:

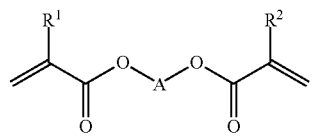

wherein A is a $C_4$ to $C_{30}$ aliphatic chain which can optionally comprise heteroatoms selected from the group consisting of O, N and S;
wherein said chain is optionally substituted with one or more acrylate or methacrylate functional groups, and/or one or more $C_1$-$C_{10}$ alkyl groups; and
wherein $R^1$ and $R^2$ may be the same or different and are each optionally selected from the group consisting of H and $C_1$ to $C_6$ alkyl.

9. The two-part curable composition according to claim 1, wherein the component containing at least two (meth)acrylate functional groups is selected from the group consisting of hexane diol diacrylate, hexane diol dimethacrylate, and di-trimethylolpropane tetraacrylate and combinations thereof.

10. The two-part curable composition according to claim 1, wherein the component containing at least two (meth)acrylate functional groups is in the second part (b).

11. The two-part curable composition according to claim 1, wherein the anhydride component is selected from the group consisting of: phthalic anhydride, tetrahydrophthalic anhydride, 4-methylphthalic anhydride, itaconic anhydride, diphenic anhydride, phenylsuccinic anhydride, 1,8 naphthalic anhydride, bromomaleic anhydride, 2,3-dichloromaleic anhydride, 2-dodecen-1-yl-succinic anhydride, homophthalic anhydride, tetrabromophthalic anhydride, bicyclo[2,2,2]oct-7-ene 2,3,5,6-tetracarboxylic dianhydride, 3-fluorophthalic anhydride, 3,3,4,4-benzophenone tetracarboxylic dianhydride, 3-nitrophthalic anhydride, 3,3,4,4-biphenyltetracarboxylic dianhydride, pyromellitic dianhydride, 1,4,5,8 naphthalene tetracarboxylic dianhydride, methacrylic anhydride, citraconic anhydride, hexahydro-4-methylphthalic anhydride, maleic anhydride, 2,3-diphenylmaleic anhydride, hexafluoroglutaric anhydride, 2,3-dimethylmaleic anhydride, tetrafluorophthalic anhydride, 1,2-cyclohexanedicarboxylic anhydride, glutaric anhydride, bromomaleic anhydride, 1,4,5,8-napthalenetetracarboxylicacid dianhydride, 1,2,4-benzenetricarboxylic anhydride, Exo-3,6-epoxy-1,2,3,6-tetrahydrophthalic anhydride, di-O-acetyl-L-tartaric anhydride, 1,2,4,5-benzenetetracarboxylic dianhydride, 1,2,4-benzenetricarboxylic anhydride and combinations thereof.

12. The two-part curable composition according to claim 1, wherein the benzonitrile compound is selected from the group consisting of: tetrafluoroisophthalonitrile, 3,5-dinitrobenzonitrile; 2-chloro-3,5-dinitrobenzonitrile; pentafluorobenzonitrile; α,α,α-2-tetrafluoro-p-tolunitrile; and tetrachloroterphthalonitrile and combinations thereof.

13. The two-part curable composition according to claim 1, wherein the benzonitrile compound is present in an amount of from 0.05 to 5 wt %, based on the total weight of the composition.

14. The two-part curable composition according to claim 1, wherein the anhydride component is present in an amount of from 0.1 to 5 wt %, based on the total weight of the composition.

15. The two-part curable composition according to claim 1, wherein the component containing at least two (meth)acrylate functional groups is present in an amount of from 1 to 20 wt %, based on the total weight of the composition.

16. The two-part curable composition according to claim 1, wherein the 2-substituted benzothiazole is 5-chloro-2-methyl benzothiazole, the anhydride is selected from the group consisting of phthalic anhydride, tetrahydrophthalic anhydride, itaconic anhydride or 4-methylphthalic anhydride and combinations thereof, and wherein the at least one benzonitrile compound is selected from the group consisting of tetrafluoroisophthalonitrile or pentafluorobenzonitrile and combinations thereof.

17. The two-part curable composition according to claim 16 wherein the benzonitrile is present in an amount of from 0.1 to 1 wt %, the anhydride is present in an amount of from 0.1 to 2 wt %, and the component containing at least two (meth)acrylate functional groups is present in an amount of from 4 to 12 wt %, based on the total weight of the composition.

18. The two-part curable composition according to claim 1, further comprising an accelerator component selected from the group consisting of calixarene, oxacalixarene, silacrown, cyclodextrin, crown ether, poly(ethyleneglycol) di(meth)acrylate, ethoxylated hydric compound, and combinations thereof.

19. The two-part curable composition according to claim 18, wherein the accelerator component comprises a calixarene which is tetrabutyl tetra[2-ethoxy-2-oxoethoxy]calix-4-arene.

20. The two-part curable composition according to claim 18, wherein the accelerator component comprises a crown ether which is selected from the group consisting of 15-crown-5, 18-crown-6, dibenzo-18-crown-6, benzo-15-crown-5-dibenzo-24-crown-8, dibenzo-30-crown-10, tribenzo-18-crown-6, asym-dibenzo-22-crown-6, dibenzo-14-crown-4, dicyclohexyl-18-crown-6, dicyclohexyl-24-crown-8, cyclohexyl-12-crown-4, 1,2-decalyl-15-crown-5, 1,2-naphtho-15-crown-5, 3,4,5-naphtyl-16-crown-5, 1,2-methyl-benzo-18-crown-6, 1,2-methylbenzo-5, 6-methyl-benzo-18-crown-6, 1,2-t-butyl-18-crown-6, 1,2-vinylbenzo-15-crown-5, 1,2-vinylbenzo-18-crown-6, 1,2-t-butyl-cyclohexyl-18-crown-6, asym-dibenzo-22-crown-6, and 1,2-benzo-1,4-benzo-5-oxygen-20-crown-7 and combinations thereof.

21. The two-part curable composition according to claim 18, wherein the accelerator component comprises a poly(ethyleneglycol) di(meth)acrylate represented by the following structure:

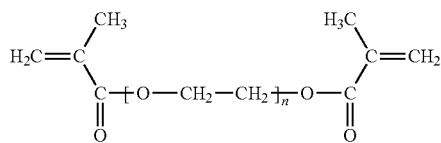

wherein n is greater than 3.

22. The two-part curable composition according to claim 1, further comprising additives selected from the group consisting of shock resistant conferring additives, thixotropy conferring agents, thickeners, dyes, thermal degradation resistance enhancers, and combinations thereof.

23. The two-part curable composition according to claim 22, wherein the shock resistant conferring additive is citric acid.

24. The two-part curable composition according to claim 1, further comprising at least one additive selected from the group consisting of: 2-sulfobenzoic acid anhydride, triethylene glycol di(paratoluene sulfonate), trifluoroethyl paratoluene sulfonate, dimethyl dioxolen-4-ylmethyl para-toluene sulfonate, paratoluene sulfonic anhydride, methane sulfonic anhydride, 1,3-propylene sulfite, dioxathiolene dioxide, 1,8-naphthosultone, sultone 1,3-propane, sultone 1,4-butene, allyl phenyl sulfone, 4-fluorophenyl sulfone, dibenzothiophene sulfone, bis(4-fluorophenyl) sulfone, ethyl p-toluenesulfonate, trifluoromethanesulfonic anhydride, ethylene sulphite and combinations thereof.

25. The two-part curable composition according to claim 24, wherein the additive is selected from 1,8-naphthosultone and ethylene sulphite, and combinations thereof.

26. The two-part curable composition according to claim 1, wherein the weight ratio of the first part to second part is in the range of 1:1 to about 10:1.

27. The two-part curable composition according to claim 26, wherein the weight ratio of the first part to second part is selected from about 2:1, 3:1, 4:1, 5:1, 6:1, 7:1, 8:1, 9:1 or 10:1.

28. The two-part curable composition according to claim 1, wherein the component containing at least two (meth)acrylate functional groups is used as a carrier material for the at least one benzonitrile compound.

29. A method of bonding together two substrates, comprising the steps of:
applying a two-part curable composition according to claim 1, to at least one of the substrates and mating together the substrates for a time sufficient to permit an adhesive bond to form from the cyanoacrylate composition between the mated substrates.

30. A two-part curable composition comprising:
(a) a first part comprising a cyanoacrylate composition comprising:
a cyanoacrylate component, and
a rubber toughening agent comprised of (i) reaction products of the combination of ethylene, methyl acrylate and monomers having carboxylic acid cure sites, (ii) dipolymers of ethylene and methyl acrylate, and combinations of (i) and (ii); and
(b) a second part comprising:
a 2-substituted benzothiazole or derivative thereof, wherein the 2-substitutent is a $C_{1-20}$ alkyl, a $C_{2-20}$ alkene, a $C_{8-20}$ alkylbenzyl, a $C_{1-20}$ alkylamino, a $C_{1-20}$ alkoxy, a $C_{1-20}$ alkylhydroxy, an ether, a sulfenamide, a $C_{1-20}$ thioalkyl or a $C_{1-20}$ thioalkoxy group; and
wherein at least one of the first or second part further comprises:
an anhydride component; and
wherein the second part further comprises:
a component containing at least two (meth)acrylate functional groups which is present in an amount of from 1 to 20 wt %, based on the total weight of the composition; and
at least one benzonitrile compound substituted with at least two or more electron withdrawing groups selected from halo, —$NO_2$, or —CN and combinations thereof.

31. The two-part curable composition according to claim 30, wherein the 2-substituted benzothiazole is selected from the group consisting of: 5-chloro-2-methyl benzothiazole, 2-methyl-1,3-benzothiazole, 2-(methylmercapto)-benzothiazole, 5-methoxy-2-methylbenzothiazole, 6-methoxybenzothiazole, 2,5-dimethylbenzothiazole and 2-methyl-5-benzothiazolol and combinations thereof;

the anhydride component is selected from the group consisting of: tetrafluoroisophthalonitrile, 3,5-dinitrobenzonitrile; 2-chloro-3,5-dinitrobenzonitrile; pentafluorobenzonitrile; α,α,α-2-tetrafluoro-p-tolunitrile; and tetrachloroterphthalonitrile and combinations thereof; and the component containing at least two (meth)acrylate functional groups is selected from the group consisting of hexanediol diacrylate, hexanediol dimethacrylate, and di-trimethylolpropane tetraacrylate and combinations thereof.

32. Cured reaction products of a two-part curable composition comprising:

(a) a first part comprising a cyanoacrylate composition comprising:

a cyanoacrylate component, and a rubber toughening agent comprised of (i) reaction products of the combination of ethylene, methyl acrylate and monomers having carboxylic acid cure sites, (ii) dipolymers of ethylene and methyl acrylate, and combinations of (i) and (ii); and (b) a second part comprising:

a 2-substituted benzothiazole or derivative thereof, wherein the 2-substitutent is a $C_{1-20}$ alkyl, a $C_{2-20}$ alkene, a $C_{8-20}$ alkylbenzyl, a $C_{1-20}$ alkylamino, a $C_{1-20}$ alkoxy, a $C_{1-20}$ alkylhydroxy, an ether, a sulfenamide, a $C_{1-20}$ thioalkyl or a $C_{1-20}$ thioalkoxy group; and wherein at least one of the first or second part further comprises:

a component containing at least two (meth)acrylate functional groups, at least one benzonitrile compound substituted with at least two or more electron withdrawing groups selected from halo, —$NO_2$, or —CN and combinations thereof, and at least one anhydride component.

* * * * *

UNITED STATES PATENT AND TRADEMARK OFFICE
CERTIFICATE OF CORRECTION

PATENT NO. : 10,100,235 B2
APPLICATION NO. : 15/602473
DATED : October 16, 2018
INVENTOR(S) : Emer Ward et al.

Page 1 of 1

It is certified that error appears in the above-identified patent and that said Letters Patent is hereby corrected as shown below:

In the Specification

Column 4, Line 25 Change "$H_2C\equiv C(CN)-COOR$" to --$H_2C=C(CN)\text{-}COOR$--

Column 4, Line 47 Change "dimethylbutoxy)-1" to --2-(1,3-dimethylbutoxy)-1--

Column 10, Line 8 Change "or a alkyl chain" to --or an alkyl $C_{11}$ chain--

In the Claims

Column 19, Line 27 Change "component is represented by" to --component is represented by materials within the structure--

Signed and Sealed this
Eighteenth Day of June, 2019

Andrei Iancu
*Director of the United States Patent and Trademark Office*